US010207472B2

(12) United States Patent
Steinbach et al.

(10) Patent No.: US 10,207,472 B2
(45) Date of Patent: Feb. 19, 2019

(54) THERMOFORMABLE PANEL FOR SHELVES (71) Applicant: SACO AEI POLYMERS, INC., Sheboygan, WI (US)

(72) Inventors: Paolo Steinbach, Como (IT); Andrea Savonuzzi, Monte Carlo (MC)

(73) Assignee: SACO AEI Polymers, Inc., Sheboygan, WI (US)

( * ) Notice: Subject to any disclaimer, the term of this patent is extended or adjusted under 35 U.S.C. 154(b) by 93 days.

(21) Appl. No.: 15/114,737

(22) PCT Filed: Feb. 10, 2015

(86) PCT No.: PCT/IB2015/000900
§ 371 (c)(1),
(2) Date: Jul. 27, 2016

(87) PCT Pub. No.: WO2015/125023
PCT Pub. Date: Aug. 27, 2015

(65) Prior Publication Data
US 2016/0339666 A1 Nov. 24, 2016

(30) Foreign Application Priority Data

Feb. 10, 2014 (IT) .............................. GE2014A0013

(51) Int. Cl.
B32B 5/02 (2006.01)
B32B 3/12 (2006.01)
(Continued)

(52) U.S. Cl.
CPC ................ B32B 3/12 (2013.01); B32B 5/022
(2013.01); B32B 5/08 (2013.01); B32B 19/02
(2013.01);
(Continued)

(58) Field of Classification Search
None
See application file for complete search history.

(56) References Cited

U.S. PATENT DOCUMENTS 5,407,516 A    4/1995  Kaufmann et al.
5,709,925 A *  1/1998  Spengler ............... B29C 70/021
                                                        428/198
(Continued)

FOREIGN PATENT DOCUMENTS

WO    WO-2013143569 A1 * 10/2013  ............. B29C 43/52

OTHER PUBLICATIONS

Written Opinion regarding application No. PCT/IB2015/000900, dated Jul. 28, 2015, 5 pages.

Primary Examiner — David Sample
(74) Attorney, Agent, or Firm — Foley & Lardner LLP (57) ABSTRACT The present invention relates to a thermoformable panel for shelves composed of: at least one core plate having a honeycomb structure composed of a plurality of adjacent cells; a coating layer that includes at least one thermoplastic material coupled to the core plate on at least one face of the core plate. The invention envisions using coating films for the honeycomb core plate that improve adhesion between the material of the honeycomb core plate and the coating films, as well as optional finishing layers overlapped thereon, reducing costs in relation to present honeycomb panels by simplifying manufacturing processes, all while maintaining elevated properties of mechanical strength and low density, and therefore a low weight.

25 Claims, 4 Drawing Sheets (51) Int. Cl.
*B32B 19/02* (2006.01)
*B32B 27/12* (2006.01)
*B32B 27/32* (2006.01)
*B32B 5/08* (2006.01)
*B32B 19/06* (2006.01)
*B32B 27/20* (2006.01)

(52) U.S. Cl.
CPC .............. *B32B 19/06* (2013.01); *B32B 27/12* (2013.01); *B32B 27/20* (2013.01); *B32B 27/32* (2013.01); *B32B 2250/40* (2013.01); *B32B 2260/046* (2013.01); *B32B 2260/048* (2013.01); *B32B 2262/02* (2013.01); *B32B 2262/10* (2013.01); *B32B 2264/06* (2013.01); *B32B 2307/738* (2013.01); *B32B 2607/00* (2013.01)

(56) References Cited

U.S. PATENT DOCUMENTS

| | | | |
|---|---|---|---|
| 6,099,680 A * | 8/2000 | Harris | B29D 24/005 156/279 |
| 2006/0105661 A1 * | 5/2006 | Steinbach | B29C 43/22 442/327 |
| 2012/0315429 A1 | 12/2012 | Stamp et al. | |
| 2014/0113104 A1 | 4/2014 | Rozant et al. | |
| 2015/0050446 A1 * | 2/2015 | Stamp | B29C 43/52 428/73 |

* cited by examiner

THERMOFORMABLE PANEL FOR SHELVES

TECHNICAL FIELD

The present invention relates to a thermoformable panel for shelves composed of:

at least one core plate having a honeycomb structure composed of a plurality of adjacent cells;

a coating layer comprising at least one thermoplastic material is coupled to said core plate on at least one face of said core plate.

BACKGROUND ART

Thermoformable panels with a honeycomb core coated on at least one face, preferably on the two opposite faces, with a coating layer are known.

Currently such panels are mainly made by spraying on a honeycomb core plate made of paperboard or the like a mixture of fibers and polyurethane. The technology is known by the name Baypreg. The panels obtained in this manner can be three-dimensionally shaped in a mould by compression molding.

Baypreg technology allows thermoformable panels having a low specific weight and an optimal mechanical strength to be obtained, however they are quite expensive and moreover the operations for spraying the polyurethane on the honeycomb cores involve dirtying problems for the operating members of the product lines.

Currently attempts have been made for obtaining thermoformable panels of the type described above by laminating sheets or films of thermoplastic materials on the faces of the honeycomb core. However such attempts have not lead to considerable results, since, when bending (particularly in hot tests) the coating layers made by lamination or by another type of connection of sheets or films to the core layer are subjected to tensile, compressive and shearing stresses that cause them to be detached from the core plate consequently losing the chemical physical bonds and causing the mechanical properties to cease.

Since this type of panels have a possible use in a great amount of different fields, from automotive to furnishings and furniture, as well as structural elements in the building field, it is of great importance the possibility of obtaining panels of this type, more easy to be fabricated and more cheap, moreover without facing a reduction in the mechanical properties and above all without facing increases of density, namely of the weight for the same mechanical strength with respect to the known panels of the same type.

SUMMARY OF THE INVENTION

Therefore, the invention aims at providing thermoformable panels of the type described hereinbefore able to overcome the drawbacks as regards the manufacturing aspect and structural, weight and cost aspects of the known panels.

Particularly in the automotive industry, the current evolution is going towards a direction according to which panels that form various accessory or coating parts have to meet at best some requirements such as for example they have to be thin, light, rigid (also at temperatures from 80 to 90° C.), as well as not much expensive, and they have to show also good acoustic insulation and waterproofing properties and have to be produced with materials having a low emission of volatile substances or of substances potentially harmful for the health.

The invention achieves the aims above by providing a thermoformable panel composed of:

at least one core plate having a honeycomb structure which are arranged with their axes substantially parallel to each other and which are oriented substantially perpendicularly to the faces of said core plate;

a coating layer comprising at least one thermoplastic material is coupled to said core plate on at least one face of said core plate, and wherein the coating layer is composed of a film or a sheet of thermoplastic material which is coupled to said core plate by a chemical/physical adhesion, at least some of the head edges of the cells of the core layer, for at least a part of their extension, having surfaces in contact and coupling with said film or sheet of the coating layer which have a size greater than the thickness of the walls of the material forming the cells.

According to a first embodiment, the invention provides the contact surfaces between the material delimiting the cells of the honeycomb core and a respective coating layer to be composed of the head edges of the shell walls that peripherally delimit the cells of the core plate and of the enlargements of said head edges in a direction parallel to the face of the core plate and/or to the surface of the coating layer, that is in a direction transverse to the axis of the cells.

Such enlargements can be composed of end tabs of said head edges extending transversely to the axes of the cells and connecting with no interruption to the head edges of said walls delimiting the cells.

According to an advantageous embodiment, the enlargements or the tabs are obtained during the step coupling the coating layers. This step provides the compression lamination of the film or sheet of thermoplastic material on the corresponding face of the core plate with a compression force that is adjusted such to partially bend to the side the head edges of the cells.

The compression force obviously changes depending on the material forming the walls delimiting the cells.

Generally the honeycomb core plate is made of paper or paperboard or of other natural fibers.

In order to make it easier to obtain such enlargements, according to an improvement, the invention provides to make the cells with head edges indented toothed or segmented in a casual manner or according to a predetermined pattern or as an alternative or in combination to have cells whose head edges do not extend on the same plane, before coupling the coating layers.

This allows the end portions of the cell walls to be bent in an easier manner for generating the enlarged areas in contact with the coating layer by applying a lower compression force and therefore avoiding the risk of applying compression forces approaching the forces collapsing the honeycomb core plate.

A second embodiment for making said enlargements of contact between the honeycomb core plate and the coating layer or layers provides the contact and coupling surfaces between the core plate and the coating layer for at least some of the cells and/or of a part of the circumferential extension thereof to be composed of end portions of the shell wall delimiting the perimeter of the cells and of the head edges of said wall.

In this case, the material of the coating layers having a predetermined thickness is penetrated by the end head portions of the walls delimiting the cells, and the contact between the material of the coating layers and the walls of the cells occurs also in the direction of the extension of said walls parallel to the axis of the cells.

In this embodiment, the contact surfaces are obtained by a partial penetration of the shell walls of the cells into the thickness of the coating layer.

By suitably selecting thicknesses and thermoplastic materials of the coating layers it is possible to obtain a combination of the two embodiments of the enlarged contact areas between the honeycomb core and the coating layers.

In both the embodiments, the chemical physical adhesion is such to guarantee that in case of bending no staggering is generated in the direction parallel to the faces of the core plate, between the latter and the coating layers and therefore the panel obtained in this manner has a considerable stiffness.

According to a further improvement, the invention as an alternative or in combination with the characteristics shown above provides to use preferred coating layers that help in enhancing the technical advantages to which the invention is directed.

A first embodiment provides the coating layer to be composed of a non woven of a combination of different thermoplastic fibers, of which a first type of thermoplastic fiber having a softening temperature (viscoelastic transition) lower than that of at least a second thermoplastic fiber.

According to a further characteristic, the coating layer is composed of a layer of continuous fibers of a thermoplastic polymer having a very higher softening temperature and of a film of a thermoplastic polymer having the softening temperature lower than said first thermoplastic polymer.

In a preferred embodiment, the lower softening temperature ranges from about 90° C. to 120° C., while the higher softening temperature ranges from about 180° C. to 300° C., particularly from about 210° to 250° C., preferably about 230/240° C.

According to a further improvement, on the external face of the coating layer, before coupling it to the core plate, contemporaneously with said coupling or after said coupling, a finishing layer is coupled made of a thermoplastic material filled with vegetable and/or mineral fillers, particularly a coating layer of a mixture of polypropylene filled with wood flour.

In this first embodiment, the coating layer composed of the non woven of plastic material fibers having a softening temperature higher than the plastic material of the film coupled to said non woven, forms interstices among which the thermoplastic material with the lower softening temperature passes once the coating layer is brought in the viscoelastic condition by heating it, such that the plastic material of the film passes through the layer of non woven material and each fiber segment is embedded in the plastic material with the lower softening temperature, forming a kind of grid embedded in the thermoplastic material with the lower softening temperature of the film and therefore a kind of reinforcement of the coating layer once the material is cooled.

According to an advantageous embodiment, it is preferred to provide a ratio of the amount of thermoplastic material with the higher softening temperature to the amount of thermoplastic material with the lower softening temperature in the order of 0.6:1 up to 1:1.

In the panel made in this manner, the fiber contained in the coating layer of non woven material is used as a reinforcement fiber, since its stiffness is considerably increased by the action stopping the relative movement between the fibers in case of a stress exerted by the plastic material.

In a further improvement the layer of non woven material is composed of a web of continuous filaments extruded through a spinneret block, so called spun bond non woven.

In one embodiment the thermoplastic material having the softening temperature higher than the thermoplastic material of the film is composed of polyester, particularly polyethylene terephthalate.

The film of thermoplastic material having the lower softening temperature in this case can be composed of polyolefin material or of other polymers.

A further characteristic is the fact that the layer of thermoplastic material forming the finishing layer has a thickness ranging from 0.5 to 3 mm, preferably in the order of about 1 mm.

In a further embodiment the coating layer of non woven material has a weight lower than 150 gr/m$^2$, preferably ranging from 90 to 110 gr/m$^2$, and a thickness lower than 100 particularly lower than or equal to 90 µm.

The film associated to said non woven has a weight lower than 90 gr/m$^2$, preferably lower than 70 gr/m$^2$, particularly lower or equal to 54 gr/m$^2$ and a thickness lower than 100 µm, particularly lower than 80 µm preferably lower than or equal to 60 µm.

A second embodiment of the coating layer provides said coating layer to be composed of a layer of thermoplastic material, particularly polyolefins, especially of polypropylene filled with flours of vegetable and/or mineral fibers and having a softening temperature preferably higher than 90° C. to which a finishing layer composed of a film or sheet of thermoplastic fibers having a softening temperature ranging from 180° C. to 300° C., particularly from 210° C. to 240° C., preferably of about 230/240° C. is coupled preferably before the coupling on at least one of the two faces of the core plate, said coating layer being intended to be coupled with the core plate by the face opposite to that provided with the film or sheet of thermoplastic material.

A further characteristic is the fact that the plate of thermoplastic material has a thickness ranging from 0.5 to 3 mm, preferably in the order of about 1 mm.

In one embodiment the coating layer is composed of a thermoplastic material and of a fiber layer, the fiber layer being composed of such a material not to have changes in the state at the softening temperature of the thermoplastic material.

According to an improvement, the film or sheet applied to the plate of thermoplastic material is made of a non woven of a combination of different thermoplastic fibers, of which a first type of thermoplastic fiber having a softening temperature (viscoelastic transition) lower than that of at least a second thermoplastic fiber.

In one variant embodiment the fiber layer is composed of natural fibers. Natural fibers for example can be cotton, yucca, sisal, hemp, coco or the like.

One embodiment provides said film to be composed of a layer of continuous fibers of a thermoplastic polymer having a higher softening temperature and of a film of a thermoplastic polymer having the softening temperature lower than said first thermoplastic polymer.

According to this embodiment, the fibers are composed of the polymer having the higher softening temperature and are in the form of one layer of continuous fibers and/or of non woven, while the polymer having the lower softening temperature is in the form of a film. Moreover the difference between the softening temperatures (temperature for the transition to the viscoelastic condition) of the two polymers is such that, by heating said polymer combination, the polymer with the lower softening temperature gets "melted" while the polymer with the higher softening temperature maintains its state and the continuous fibers maintain their shape and/or structure. This results in the polymer with the lower softening temperature occupying, by "pouring", the interstices among the fibers composed of the polymer having the higher softening temperature that have maintained the shape and structure and that thus are embedded in the softened polymer having the lower softening temperature. In the cooling condition therefore the reinforcement layer is composed of continuous fibers composed of the thermoplastic material with the higher softening temperature embedded and locked in the polymer array having the lower softening temperature.

According to a further characteristic the lower softening temperature ranges from about 90° C. to 120° C., while the higher softening temperature ranges from about 180° C. to 300° C., particularly from about 210° C. to 250° C., preferably it is of about 230° C.

As regards the film or sheet applied to the thermoplastic material layer of such second embodiment of the coating layer, said film or sheet can be made according to what described above for the coating layer according to the first embodiment.

Still another optimization of the ratio of stiffness or mechanical strength to weight of the composite panel is obtained when in the reinforcement layer the ratio of the polymer with the higher softening temperature to the polymer with the lower softening temperature is from 0.6:1 to 1:1.

The use of materials with a different softening temperature, of which at least one material composed of natural or thermoplastic fibers, when reaching the lower softening temperature allows an assembly to be created wherein the fibers that have not been subjected to changes can slide with respect to each other allowing the panel to get deformed. When the temperature is again lowered under the softening value, the thermoplastic array solidifies again by locking the fibers in place.

Therefore the lamination temperature is selected within the softening range of the thermoplastic material with the lower softening temperature. Thus there is a better penetration between core, fibers and the coating layer of further thermoplastic resin, if any.

The present invention further relates to a thermoformable panel comprising a honeycomb core plate composed of a plurality of adjacent cells whose axes are oriented perpendicularly or substantially perpendicularly to the faces of said plate and to each face of said core plate a coating layer is coupled which is composed of a film or sheet of thermoplastic material having a softening temperature ranging from about 180° C. to 300° C., particularly from about 210° C. to 250° C., preferably of about 230° C.

In one embodiment said coating layer is composed of a layer of continuous fibers of a thermoplastic polymer having the higher softening temperature and of a film of thermoplastic polymer having the softening temperature lower than said first thermoplastic polymer.

Said coating layer can have one or more of the characteristics described above for the coating layer according to the first embodiment.

In combination the thermoformable panel can have in combination also the characteristics of the enlarged surfaces of contact between the core plate and the coating layer or layers.

On the contrary an alternative embodiment of the thermoformable panel provides it to comprise a core plate composed of a plurality of adjacent cells whose axes are oriented perpendicularly or substantially perpendicularly to the faces of the said plate and to each face of said core plate a coating layer is coupled which is composed of a layer of thermoplastic material particularly polyolefins, especially polypropylene filled with flours of vegetable and/or mineral fibres and having a softening temperature preferably higher than 90° C., preferably before the coupling on at least one of the two faces of the core plate, a layer composed of a film or a sheet of thermoplastic fibers having a softening temperature ranging from 180° C. to 300° C., particularly from 210° C. to 240° C., preferably of about 230° C., said coating layer being intended to be coupled to the core plate by the face opposite to that provided with the film or sheet of thermoplastic material.

In an alternative embodiment the sheet is composed of a layer comprising a first thermoplastic polymer with high polarity and a second thermoplastic polymer with high resilience.

This guarantees an optimal adhesion due to the high polarity of the first polymer and a contemporaneous good strain and wear strength due to the high resilience of the second polymer.

In a preferred example the first polymer is polyvinyl alcohol and the second polymer is polyamide.

In a further improvement the layer has a content of mineral or vegetable filler. As the filler it is possible preferably to use wood flour, or talc or other types of fillers currently known in the art. The filler allows the panel strength to be improved.

The invention further relates to an intermediate thermoformable panel composed of a coating layer on one of the two faces that coplanar with said face has perimetral tabs projecting beyond the peripheral edges of the core plate, while on the opposite face of the core plate, the coating layer applied thereon overlaps by coupling thereto also the peripheral edges of said core plate and to the perimetral tabs projecting beyond the peripheral edges.

Thus a thermoformable panel is obtained that on all the sides, that is the two faces and the peripheral edges is coated by the material of the coating layer the shape and the dimensions of the core plate being recognizable on one face such to facilitate the correct positioning for example into the mold of a forming press.

The present invention further relates to a method for making a thermoformable panel according to what described above which method comprises the following steps:

step a) coupling on one or two faces of a honeycomb core plate a coating film by chemical physical adhesion thereto of said film, which film is made according to one or more of the variants described above;

step b) subsequently coupling on one of the two faces of the core plate to the corresponding coating film a finishing layer such as described above.

According to a further characteristic of the method, in step a, the coupling occurs in a laminator at a heating temperature ranging from 180° C. to 300° C., particularly from 210° C. to 240° C., preferably of about 230° C.

Moreover step b) is performed at a softening temperature higher than 90° C., preferably at 180° C. particularly ranging from about 210° to 240° C., preferably at about 230° C.

According to one embodiment step b) provides to contemporaneously thermoform the panel in a mold according to a three-dimensional pattern of the panel.

A variant of said method provides the following steps:

a1) cutting to size the honeycomb core plate according to predetermined dimensions;

a2) cutting to size a first and a second coating layers with an area greater than that of the honeycomb core plate a3) centrally arranging the honeycomb core plate on a first finishing layer such that a peripheral band of said first layer projects beyond the peripheral edge of the honeycomb core layer by a predetermined amount and preferably along the entire peripheral edge of the honeycomb finishing plate;

a4) arranging on the top face of the honeycomb core plate the second coating layer, by placing it in a position substantially congruent with the first coating layer;

a5) bending the second coating layer about the core plate, along the peripheral edges of said honeycomb core plate and against the first coating layer, by means of a bending frame of said second top coating layer;

a6) coupling the coating layers to the faces of the core plate and to the peripheral edges of said core plate, as well as coupling the projecting parts of said first and second coating layers with each other by hot lamination, during the lamination keeping said assembly of core plate and coating layers in said bending frame.

Still a variant embodiment of the method provides the steps:

step c) coupling on one of the two faces of a plate of thermoplastic material, particularly polyolefins, especially polypropylene filled with flours of vegetable and/or mineral fibers and having a softening temperature preferably higher than 90° C. a layer in the form of a thermoplastic fiber film having a softening temperature ranging from 180° C. to 300° C., particularly from 210° C. to 240° C., preferably of about 230° C., step d) coupling said coating layer on one or both the faces of the core plate by the face opposite to that provided with the film or the sheet of thermoplastic material by hot lamination and/or in a three-dimensional modelling process by hot molding or rolling process, hot calendering.

BRIEF DESCRIPTION OF DRAWINGS

These and other characteristics and advantages of the present invention will be more clear from the following description of some non limitative embodiments shown in the annexed drawings wherein.

DESCRIPTION OF EMBODIMENTS

The description below shows several variant embodiments of the panel according to the present invention. These variants are not to be considered as a limitation, but merely as an illustration of the inventive concept that consists in providing a thermoformable panel with a honeycomb core plate on at least one of its faces a coating layer of plastic material is applied, preferably by lamination or the like such to avoid the different mechanical properties of the honeycomb core plate and of the coating layer or layers—depending on the core plate being riveted on one or two faces—causing said layers to separate from each other at least partially at different areas upon bending, due to a relative displacement in a direction parallel to the contact surfaces, thus guaranteeing an optimal stiffness in connection with a limited weight and with the use of less expensive plastic materials.

Although the examples show the presence of coating layers on both the faces of the honeycomb core plate, it is also possible that only one of the faces is coupled to a coating layer or that different coating layers are coupled to the two faces depending on the different embodiments thereof provided in the present description.

Figure 1:
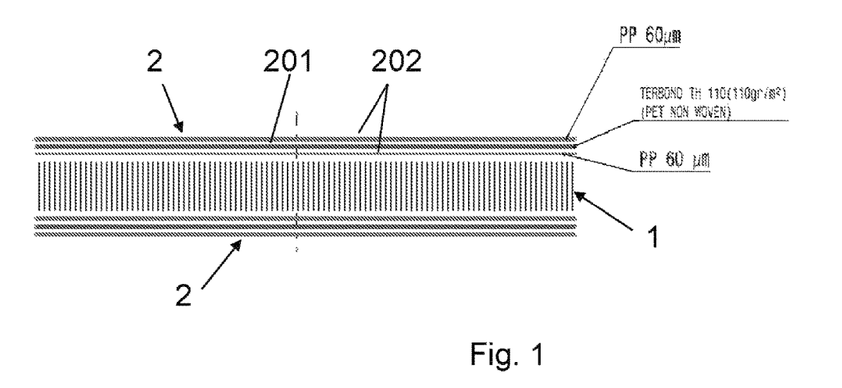
FIG. 1 schematically is the structure of a thermoformable panel with a honeycomb core plate according to a first embodiment of the present invention.

FIG. 1 shows a first embodiment wherein a honeycomb core plate 1 is coupled on both the faces with a coating layer 2.

The honeycomb core plate is preferably made of paperboard or similar materials and it is obtained according to known techniques.

Each one of the coating layers 2 is composed of at least two layers, preferably three layers of which at least one layer 202 composed of a non woven of fibers of a first thermoplastic polymer and at least one second layer is composed of a film 201 of a second thermoplastic polymer different than the thermoplastic polymer the fibers of the non woven are made of and having a softening temperature (viscoelastic transition) lower than that of the thermoplastic polymer the fibers of the non woven are made of.

Particularly the second thermoplastic polymer has the lower softening temperature ranging from about 90° C. to 120° C., while the first thermoplastic polymer the fibres of the non woven are made of has a higher softening temperature ranging from about 180° to 300°, particularly from about 210° to 250°, preferably of about 230°.

In FIG. 1 there are provided two films 202 composed of the second thermoplastic polymer the non woven layer with fibres of the first thermoplastic polymer is provided therebetween.

The PET non woven 201 is coated with 2 films that have a double effect and that is to stop the sliding of the fibers when are subjected to a force, an effect that is obtained also by using a mix of two fibers with a different molecular weight and therefore with different softening temperatures, such as described above and also to guarantee the adhesion on the two interfaces (the one with the honeycomb 1 and the above one with the wood-stock plate 4). The PET-based films 202 further guarantee the finished panel, during tests at 80/90° C., to withstand bending in the automotive industry.

Figure 2:
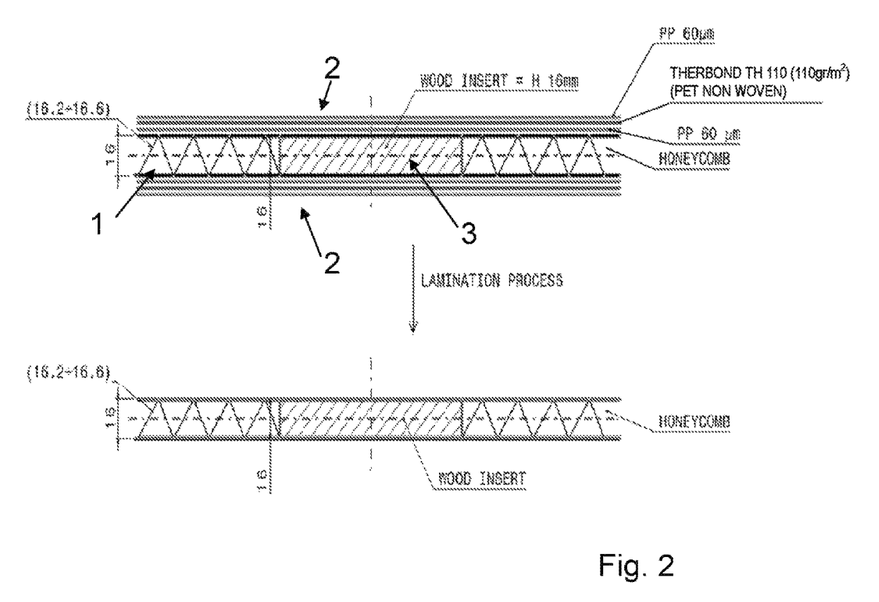
FIG. 2 is a variant embodiment of the steps for coupling the coating layers to the faces of the honeycomb core plate.

According to one embodiment and such as pointed out in FIG. 2, the coupling of the coating layer or layers 2 to the honeycomb core plate 1 occurs for example by hot lamination.

Preferably the coupling occurs in a laminator at a heating temperature ranging from 180° C. to 300° C., particularly from 210° C. to 240° C., preferably at about 230° C.

In these conditions, the polymer with the lower viscoelastic transition temperature penetrates into the interstices of the fibers of the non woven. The latter remain substantially entire since they are composed of a polymer having a higher softening temperature. Thus the fibers are surrounded by the mass of the polymer with a lower softening temperature and are embedded therein forming a reinforcing grid that remains firmly anchored into the material of the polymer having the lower softening temperature upon cooling. Contemporaneously, the pressure exerted in the lamination against the honeycomb core plate 2 is such to generate two possible effects that can be provided both individually and alternatively and in combination with each other.

Figure 3:
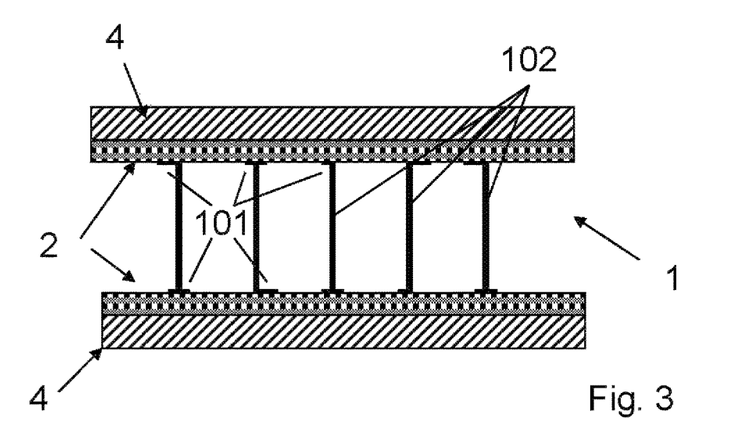
FIG. 3 schematically is an enlarged section of the thermoformable panel according to this first embodiment.
Figure 5:
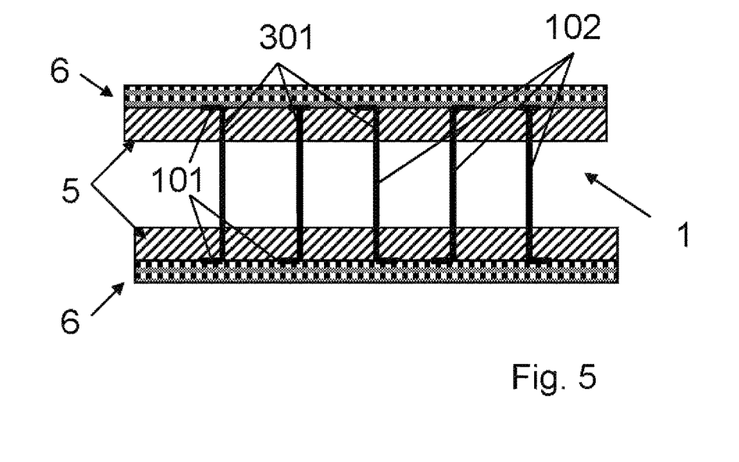
FIG. 5 is, like the previous figures, a combination of the variant embodiments according to FIGS. 3 and 4.

FIGS. 3 and 5 show such situation.

FIG. 3 schematically shows a section of a panel according to the present invention, wherein in addition to the coating layers there are provided the external finishing layers 4 one on each of the coating layers 2.

Moreover in the case of FIG. 3, the pressure applied for coupling the coating layer to the core plate 1 has partially deformed the head edges of the shell walls 201 of the cells, forming transverse tabs 101 that widen the contact surface between the core plate 2 and the coating layers 1.

Such effect can be promoted by making the head ends of the cells with head edges that are indented and/or not all coplanar with each other.

According to a variant embodiment from FIG. 2, in order to avoid the core plate 2 to be excessively pressed it is possible to provide one or more material inserts, such as wood or the like whose thickness corresponds to the finished thickness of the core plate and that therefore form incompressible stops such to protect the honeycomb core plate against such a pressure that can cause the structure to collapse. Such inserts may be used also for fastening components made of plastic or metal on the external surface of the finished shelf by means of screws.

In a preferred embodiment, the honeycomb core plate is made of paperboard or the like.

It may have a thickness from about one to several centimeters.

As regards the coating layer one embodiment provides the non woven layer to be composed of fibers of polyester, particularly polyethylene terephthalate.

The films 201 of thermoplastic material with a lower softening temperature for example are composed of polyolefin material or other polymers.

The non woven material layer has a weight lower than 150 $gr/m^2$, preferably lower than 100 $gr/m^2$, particularly lower than or equal to 90 $gr/m^2$, and a thickness lower than 100 particularly lower than or equal to 90 µm.

The film associated to said non woven has a weight lower than 90 $gr/m^2$, preferably lower than 70 $gr/m^2$, particularly lower than or equal to 54 $gr/m^2$, and a thickness lower than 100 particularly lower than 80 preferably lower than or equal to 60 µm.

The honeycomb core plate is made of paperboard or similar materials, while the finishing layer can be made of different materials, and in a preferred variant it is composed of thermoplastic material, particularly polyolefins, especially polypropylene filled with flours of vegetable and/or mineral fibers.

In one embodiment, the finishing layer 4 is applied to the panel, on one of the external faces of one of the coating layers 2 after coupling the coating layers to the honeycomb core plate 1.

The variant of FIG. 4 can be provided at least partially also by using a coating layer such as that described with reference to FIGS. 1 to 3, however it is possible to provide the coating layer to be composed of a plate of thermoplastic material 5, particularly a plate of polyolefins, especially polypropylene filled with flours of vegetable and/or mineral fibers and having a softening temperature preferably higher than 90° C.

To such plate a finishing layer 6 is in turn coupled which is composed of a film or a sheet of thermoplastic fibers having a softening temperature ranging from 180° C. to 300° C., particularly from 210° C. to 240° C., preferably of about 230° C.

Particularly the finishing film 6 is composed of a combination of two thermoplastic polymers each one having a different viscoelastic transition temperature and that is a higher one and a lower one.

Still according to a further characteristic the finishing layer 6 is made according to one or more of the variants described for the coating layer 2 of the previous embodiment according to FIGS. 1 to 3.

The thermoplastic plate composed of polyolefins, preferably polypropylene, filled with flours of vegetable and/or mineral fibers is initially coupled only with the finishing film. The combination of thermoplastic plate 5 and finishing layer 6 then is coupled together to the honeycomb core plate 1 forming its coating layer, the face of the thermoplastic material plate 5 and the face of the core plate 1 being put in contact.

In this case, since the thermoplastic material plate 5 has a low viscoelastic transition temperature, the end portions of the walls 102 delimiting the cells penetrate into the thickness of the thermoplastic material plate 5 partially embedding therein and for a given amount defined by the exerted compression.

Figure 4:
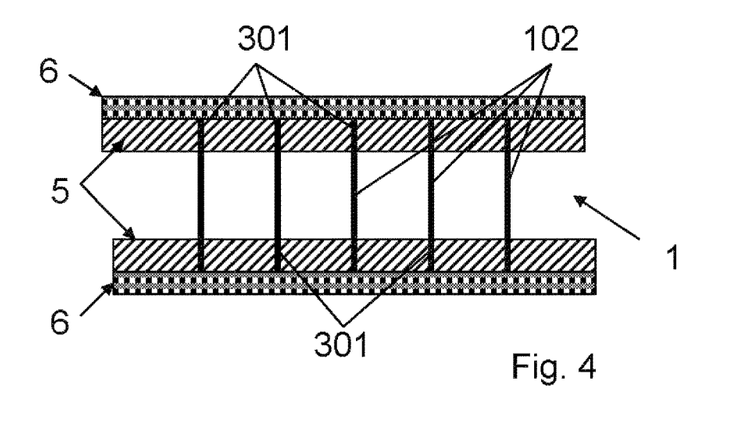
FIG. 4 schematically is an enlarged section of the panel according a second embodiment of the present invention.

This situation is shown in FIG. 4 where said end portions on the head sides of the cells 102 that are denoted by 301 penetrate into the thickness of the material of the thermoplastic material plate 5.

When the finishing layer is made as described with reference to the example in FIGS. 1 to 3, due to the higher viscoelastic transition temperature, said layer remains substantially not penetrable by the end portions 301 of the walls 102 delimiting the cells.

By applying a suitable coupling compression, it is possible to obtain a combination of effects of enlarging the contact surfaces between core plate 1 and coating layer composed of the combination of the layers 5 and 6. In this case as it results from FIG. 5 in addition to the layer 5 penetrated by the end portions 301 of the walls of the cells 102, these end portions also bent at least for a part forming transverse tabs 101.

It has to be noted that in FIGS. 4 and 5 the walls 102 of the cells penetrate through the thickness of the thermoplastic material plate up to the finishing layer 6. However both in the variant of FIG. 4 and in that of FIG. 5, it is possible for some of the cells to have the head edge and/or the associated transverse tab to end at a given distance from the finishing layer 6.

This depends on the initial coplanarity of the head edges of the walls delimiting the cells in the core plate 1 or also on the provision of a preventive treatment of the core plate 1 making the head edges of the walls 102 delimiting the cells as indented, toothed or not coplanar anyway.

Figure 6:
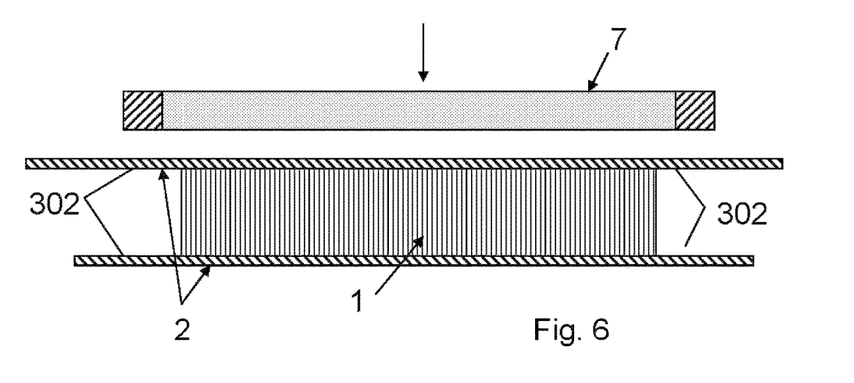
FIGS. 6 to 8 show respectively the steps of applying the coating layers to a honeycomb core plate for making a thermoformable panel according to a fourth embodiment of the present invention.
Figure 7:
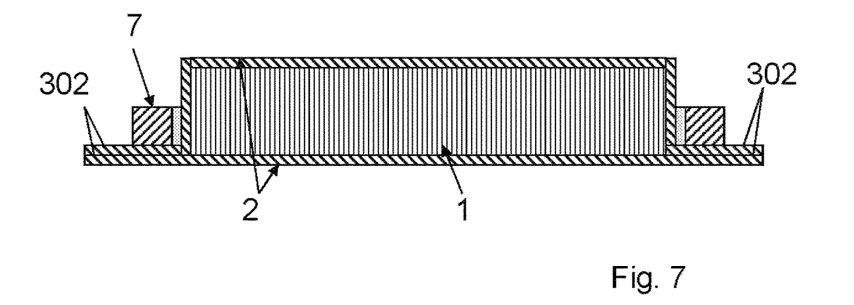
Figure 8:
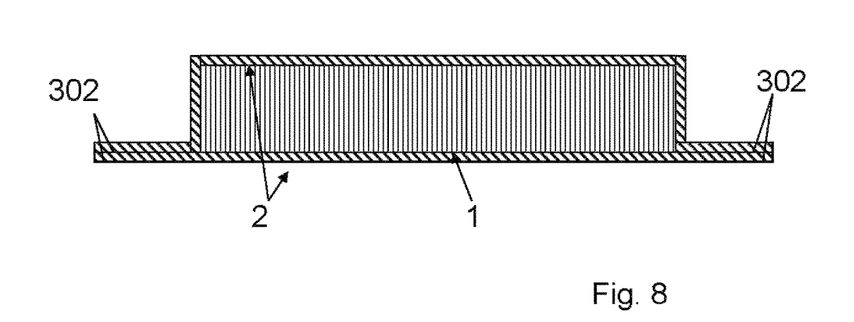

With reference to FIGS. 6 to 8, they show the steps for making a thermoformable panel with a honeycomb core according to a further variant of the present invention.

In this case the panel has a honeycomb core plate 1 closed at all the sides, that is also along the perimetral edge by a coating layer 2 which is made according to one of the different variants described.

In this case the thermoformable panel obtained is a kind of blank panel that is an intermediate product that can be stored and used in combination with other material layers, such as for example one or more finishing layers 4, for making three-dimensionally shaped parts, for example by molding.

For producing such panel, it is provided to cut to size the honeycomb core plate 1 and sheets of material intended to form the coating layers according to one or more of the preceding embodiments, the latter having dimensions greater than those of the core plate 1.

A first sheet composed of the material layers according to one of the preceding examples is arranged on a plane and the core plate 1 is placed, centered thereon. On the upper face of the core plate 1 therefore the further sheet or assembly of sheets intended to form the coating layer 2 of the upper face of the core plate 1 is placed.

A frame 7 vertically movable from an idle position to a position where it surrounds all the perimetral edge of the core plate bends, during its translation, the sheet or the assembly of sheets intended to form the upper coating layer 2, this sheet or these sheets also against the perimetral edge and it compresses the remaining perimetral edge of said sheet or said assembly of sheets against the sheet or assembly of sheets intended to form the lower coating layer 2.

This assembly in the condition described and shown in FIG. 7 is placed on the laminator for applying the layers 2 to the honeycomb core plate 1 by lamination. During the lamination also the peripheral parts 302 of the two coating layers 2 that surround the perimetral edge of the core plate 1 are coupled with each other by chemical/physical adhesion projecting beyond said perimetral edge and thus forming a thermoformable panel with the honeycomb core completely coated and with a perimetral frame extending coplanar with one of the two faces.

Figure 9:
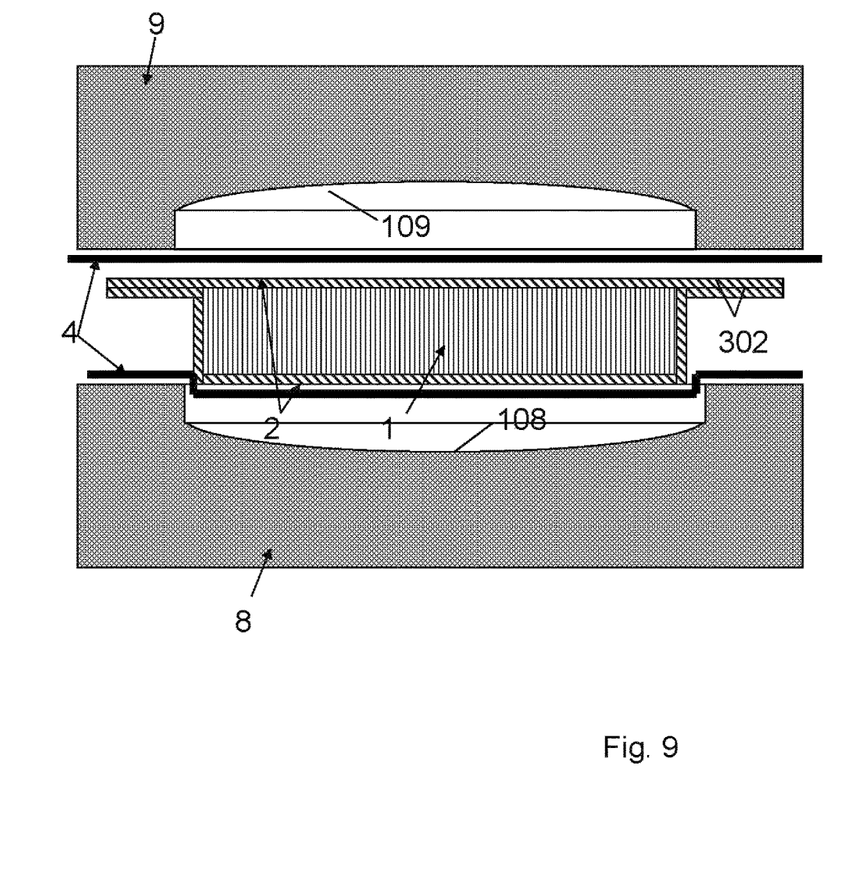
FIG. 9 schematically shows the step of three-dimensional forming of the thermoformable panel according to the embodiment of the previous FIGS. 3 to 5 by a mould.

This embodiment has the advantage that the shape of the core plate 1 remains easily recognizable and therefore the proper positioning of the thermoformable panel in a mold is considerably facilitated for the additional treatment, such as shown in FIG. 9.

This figure shows a mold 8 and a countermold 9 having forming surfaces with a predetermined three-dimensional profile denoted by 108 and 109. As it is possible to see since the shape of the core plate 1 is recognizable it is possible to properly house the thermoformable panel relative to the molds.

In FIG. 9, the forming step provides contemporaneously the step of applying further external finishing layers 4 according to one or more of the embodiment described above.

In this case the fact of extending the two coating layers 2 with respect to the surface of the honeycomb core plate 1, not only helps the side edges thereof to be covered with the coating layer that improves the adhesion of the finishing layer 4 also along the edges and therefore that guarantees a higher mechanical strength, but it helps also to stiffen the two external finishing plates 4 that are sealed with each other along the perimeter of the panel during the thermocompression step. In this case the coating layers 2 and particularly the non woven layers 201 and the films 202 remain compressed along the edges between the two plates, forming a stronger perimetral edge of the panel. Such perimetral edge can be provided with different sectional shapes, for example with a U-shaped cross-section instead of a flat one as in the drawing.

The invention claimed is:

1. A thermoformable panel comprising:
a core plate having a honeycomb structure, which comprises a plurality of adjacent cells arranged with their axes substantially parallel to each other and substantially perpendicular to opposing faces of the core plate;
a thermoplastic polymer film bonded to at least one of the faces of the core plate; and
a second layer bonded to a face of the thermoplastic polymer film, which is opposed to the core plate; wherein the second layer comprises a nonwoven layer of continuous thermoplastic polymer fibers embedded in a thermoplastic material;
wherein at least some of the core plate cells have head edges which at least partially penetrate into the thermoplastic polymer film; wherein at least some of the head edges have enlargements in a direction transverse to the axis of the cells.

2. The panel of claim 1, wherein the thermoplastic polymer film comprises a thermoplastic polyolefin and vegetable and/or mineral fibers.

3. The panel of claim 1, wherein the core plate comprises a plurality of cells peripherally delimited by a shell wall made of natural fibers.

4. The panel of claim 1, wherein thermoplastic material has a lower softening temperature and the continuous thermoplastic polymer fibers have a softening temperature which is higher than the lower softening temperature.

5. The panel of claim 4, wherein the lower softening temperature is about 90 to 120° C. and the continuous thermoplastic polymer fibers have a softening temperature of about 180 to 300° C.

6. The panel of claim 1, wherein the ratio of the continuous thermoplastic polymer fibers to the thermoplastic material is 0.6:1 to 1:1.

7. The panel of claim 1, wherein the thermoplastic polymer film comprises polypropylene filled with wood flour.

8. The panel of claim 1, wherein the non-woven layer has a weight of less than 150 g/m$^2$ and a thickness of less than 100 μm.

9. The panel of claim 1, wherein the thermoplastic polymer film has a thickness of about 0.5 to 3 mm.

10. The panel of claim 1, wherein the continuous thermoplastic polymer fibers comprise polyester fibers and the thermoplastic material comprises polyolefin.

11. The panel of claim 1, wherein the continuous thermoplastic polymer fibers comprise polyethylene terephthalate fibers and the thermoplastic material comprises polypropylene.

12. The panel of claim 1, wherein the thermoplastic polymer film is bonded to a first face of the core plate; and
a second thermoplastic polymer film is bonded to an opposing face of the core plate; and
a third layer is bonded to a face of the second thermoplastic polymer film, which is opposed to the core plate; wherein the third layer comprises a nonwoven layer of continuous thermoplastic polymer fibers embedded in a thermoplastic material;
wherein at least some of the core plate cells have head edges which at least partially penetrate into the second thermoplastic polymer film.

13. The panel of claim 1, wherein the core plate comprises a plurality of cells peripherally delimited by a shell wall made of natural fibers;
the thermoplastic polymer film has a thickness of about 0.5 to 3 mm and comprises polypropylene filled with wood flour and/or talc;
the non-woven layer has a weight of less than 150 g/m$^2$ and a thickness of less than 100 μm; and the continuous thermoplastic polymer fibers comprise polyethylene terephthalate fibers and the thermoplastic material comprises polypropylene.

14. A method for making the thermoformable panel of claim 1, comprising the following steps:
coupling the second layer on a first face of the thermoplastic polymer film; and
subsequently coupling a second face of the thermoplastic polymer film on a face of the core plate such that at least some head edges of the core plate cells at least partially penetrate into the thermoplastic polymer film.

15. A thermoformable panel comprising:
a core plate having a honeycomb structure, which comprises a plurality of adjacent cells arranged with their axes substantially parallel to each other and substantially perpendicular to opposing faces of the core plate; wherein at least some of the core plate cells have head edges with enlargements in a direction transverse to the axis of the cells;
a coating layer bonded to enlarged head edges on one of the core plate faces; wherein the coating layer comprises a nonwoven layer of continuous thermoplastic polymer fibers embedded in a thermoplastic material; and
a thermoplastic polymer film bonded to a face of the coating layer, which is opposed to the coating layer face bonded to the core plate; wherein the thermoplastic polymer film comprises thermoplastic polyolefin and vegetable and/or mineral fibers.

16. The panel of claim 15, wherein the thermoplastic polymer film has a thickness of about 0.5 to 3 mm and comprises polypropylene filled with wood flour.

17. The panel of claim 15, wherein the continuous thermoplastic polymer fibers comprise polyester fibers having a softening temperature of about 210 to 250° C. and the thermoplastic material comprises polyolefin having a softening temperature of about 90 to 120° C.

18. The panel of claim 15, wherein the continuous thermoplastic polymer fibers comprise spun bond, non-woven polyethylene terephthalate fibers; the thermoplastic material comprises polypropylene; and the thermoplastic polymer film comprises polypropylene filled with wood flour and/or talc.

19. A thermoformable panel comprising:
a core plate having a honeycomb structure, which comprises a plurality of adjacent cells arranged with their axes substantially parallel to each other and substantially perpendicular to opposing faces of the core plate; wherein at least some of the core plate cells have head edges with enlargements in a direction transverse to the axis of the cells;
a coating layer bonded to the enlarged head edges on at least one of the core plate faces; wherein the coating layer comprises a nonwoven layer of continuous thermoplastic polymer fibers having a softening temperature of about 180 to 300° C. embedded in a thermoplastic material, which has a softening temperature of about 90 to 120° C.

20. The panel of claim 19, wherein at least some of the head edges with enlargements at least partially penetrate into the coating layer.

21. The panel of claim 19, wherein the thermoplastic material comprises thermoplastic polyolefin; and the nonwoven layer comprises non-woven polyester fibers.

22. The panel of claim 19, wherein the thermoplastic material comprises polypropylene filled with wood flour and/or talc; and the nonwoven layer comprises spun bond, non-woven polyethylene terephthalate fibers.

23. The panel of claim 19, further comprising a finishing layer bonded to an external face of the coating layer on one face of the core plate; wherein the finishing layer comprises polypropylene filled with wood flour and/or talc.

24. The panel of claim 19, wherein the coating comprises a first thermoplastic polymer that is polyvinyl alcohol and a second thermoplastic polymer that is polyamide.

25. The panel of claim 19, wherein the core plate comprises a plurality of cells peripherally delimited by a shell wall made of natural fibers;
the non-woven layer has a weight of less than 150 g/m$^2$ and a thickness of less than 100 μm; and the continuous thermoplastic polymer fibers comprise polyethylene terephthalate fibers and the thermoplastic material comprises polypropylene.

* * * * *